United States Patent Office 3,110,651
Patented Nov. 12, 1963

1

2

3,110,651

METHOD OF ARTIFICIAL CULTIVATION OF ERGOT

Jan Kybal, Jiří Protiva, Karin Strnadová, František Starý, and Zdeněk Čekan, all of Prague, Czechoslovakia, assignors to Spofa, Sdruzeni podniku pro zdravotnickou vyrobu, Prague, Czechoslovakia No Drawing. Filed Nov. 6, 1961, Ser. No. 150,209
Claims priority, application Czechoslovakia Nov. 11, 1960
4 Claims. (Cl. 195—81)

The invention relates to a method of artificial cultivation of ergot (*Claviceps purpurea* Tul.).

From alkaloids produced by various representatives of the genus Claviceps Tul. of the order Xylariales (formerly Sphaeriales), the ergotamine is most used in the medical practice. Till this time the sole source of ergotamine (and also of other ergot alkaloids), suitable for isolation of said alkaloid on commercial scale, were the sclerotia of the ergot species (*Claviceps purpurea* Tul.) grown in parasitic culture on artificially infected rye ears. By selection of pure races and strains of fungi there was possible to obtain from the originally heterogeneous material some high-content strains producing only the desired ergotamine, without any practically significant admixture of alkaloids of the ergotoxin group. This fact along with a complete mechanisation of the infection process and crop of ergot made possible rational field production of the latter, and could set aside the drug obtained by collection of widely grown sclerotia, formerly used for processing.

Regarding the large consumption of ergot alkaloids and their relatively high prices, there have been already in the beginnings of the field production first attempts made to effect the biosynthesis of ergot alkaloids in saprophytic cultures. In the first research phase various authors (W. Bonns, Am. J. Bot. 9, 339, 1922; A. McCrea, Am. J. Bot. 18, 50, 1931; R. Jaretzky, Arch. Pharm. 273, 348, 1935; E. Baldacci, Farmaco 1, No. 2–3, 1946; H. D. Michener, N. Snell, Am. J. Bot. 37, 52, 1950) tried to use current microbiological methods for cultivation without particular consideration of the character of the fungus. This way did not lead to the desired end, since the cultures did not produce any alkaloids. Also the methods formerly used for estimation of alkaloids (the Van Urk's reaction with p-dimethylamino benzaldehyde, and pharmacological tests) proved to be not specific enough to allow univocal interpretation of the results thus obtained. Only the development of partition chromatography and its utilization in the determination of ergot alkaloids (K. Macek, Pharmazie 9, 420, 1954) made it possible to take in hand serious experimental research of biosynthesis in cultures in vitro. This method proved successful in obtaining a closer knowledge of the development biology of the fungus in the natural parasitic culture on the host plant, and for applying it for artificial saprophytic cultures (J. Kybal, F. Starý, Planta Medica 6, 406, 1958). On the basis of said experimental research the problem of ergot alkaloid synthesis by saprophytic cultivation in vitro can be considered positively solvable.

Experiments with alkaloid biosynthesis of the peptide type including also ergotamine are mentioned by a number of authors in their papers (A. G. Paul et al., J. Am. Pharm. Assoc., Sci. Ed. 43, 205, 1954; W. A. Taber, L. C. Vinning, Canad. J. Microbiol. 3, 1, 1957 and 4, 611, 1958); however, only a few of them succeeded in isolation and identification of some of these alkaloids from their cultures (H. Rassbach et al., Arzneimittel-Forsch. 6, 690, 1956; J. Kybal, F. Starý, cited above). However, the data concerning said experiments are generally incomplete and not reproducible thereof. A more detailed information can be found only in the patent literature.

In this respect the following patents deserve particular attention:

U.S. Pat. No. 2,056,360 (1936), A. McCrea, concerning ergot preparations by means of saprophytic cultivation. British Pat. No. 755,555 and French Pat. No. 1,108,120 covering isolation of a mixture of ergotamine, ergotaminine and ergometrine from stationary cultures on liquid medium. In both patents as the necessary condition for realisation of biosynthesis the presence of ions $Fe^{++}$ and $Zn^{++}$ in the nutrient medium, within an explicitly defined range, is cited. However, in reproduction of the experiment by the authors of the present application, neither $ZnSO_4$ nor $FeSO_4$ showed any marked influence on the alkaloid formation. The Jap. Pat. No. 178,336, Brit. Pat. No. 757,696 and the Belgian Pat. No. 115,266 identical with the latter, relate merely to clavine type alkaloids obtained in saprophytic culture. In the Japanese patent for the first time the idea of inhibiting the microorganism growth in that cultivation phase in which the alkaloid biosynthesis has to set in, is formulated.

The West German Pat. No. 1,073,689 and the Brit. Pat. No. 837,473 are concerned with surface and submerged cultivations leading to a mixture of alkaloids of the ergotoxin group, ergotamine, and ergometrine, including their optical isomers, and low-molecular alkaloids of the clavine series. The particularity of these fermentations lies in their course in two subsequent stages under different cultivation conditions, the second stage conditions being directed to stopping air access or to addition of respiration poisons provoking deficiency of assimilable nitrogen, phosphorus and sulfur.

In the research of biosynthesis of ergotamine by means of saprophytic cultivation of ergot the authors of the present invention were led by the endeavor to bring the in vitro culture conditions possibly near to the natural development of the fungus as it takes place in parasitic culture on the host plant. This idea was published in 1958 (J. Kybal, F. Starý, cited above), and at the same time there was for the first time reported on isolation of pure ergotamine from a saprophytic mycelium (J. Kybal, F. Starý, cited above). Since that time the optimal conditions for ergot alkaloid biosynthesis in saprophytic culture were experimentally verified in detail, and elaborated to a reproducible procedure giving economically significant yields of ergot alkaloids, above all of the most desired ergotamine.

The subject of the invention is now the method of artificial cultivation of ergot (*Claviceps purpurea* Tul.) in surface or submerged culture conditions, under air access, on liquid nutrient media containing sugars, such as sucrose or glucose, sources of assimilable nitrogen, nutritive mineral salts, trace elements and growth factors, at a temperature 20–30° C. and at pH value 4–7. The essence of the method according to the invention lies in that it is performed in a nutrient medium containing 2–30% weight/volume, preferably 5–10%, mixtures of sucrose or glucose with a hexitol, particularly sorbitol or mannitol in weight ratio from 1:1 to 10:1, preferably 3:1, and further assimilable nitrogen in the form of ammonium ions in a quantity 0.05–1.0% wt./vol. and organic acids with 2–6 carbon atoms, monocarboxylic up to tricarboxylic, both saturated or unsaturated, possibly substituted by hydroxyl groups on the carbon chain, or containing a keto group in the carbon chain, such as oxalic, citric, fumaric, malic, lactic or pyruvic acids, in a quantity 0.05–5.0% wt./vol., whereupon the cultivation is interrupted on attaining the highest content of the ergot alkaloids, related to the volume unit of the nutrient medium.

In the case of a surface cultivation there proves useful addition of substances increasing viscosity of the nutrient medium, such as agar, gelatin, methylcellulose, and the like, in a quantity of 0.01–2.0% wt./vol. related to the volume of the nutrient medium.

For cultivation there are used strains obtained by isolation of single conidia or single ascospores from ergot sclerotia parasiting on rye or other hosts. To the purpose highly productive sclerotia having the desired alkaloid spectrum are selected. The isolation of the single spores is carried out with aid of the unispore isolation apparatus suggested by Nečásek et al. (Preslia 26, 105, 1954). The monospore cultures thus obtained are maintained by periodically repeated inoculations on malt-agar. As the preserve of productive strains serve the sclerotia obtained by annual artificial infection of rye. The degree in which the strain is keeping its purity and required quality is verified by analytical assay.

For inoculation of the fermentation media there is used an inoculum prepared by cultivation on a rotary shaker in 500 ml. flasks filled each with 80 ml. inoculation medium. For the cultivation of the inoculum the most suitable is malt infusion of 3° Bé density with initial pH 6.0. For inoculation of the inoculum media serve aqueous suspensions of conidia washed off from cultures 17–21 days old. For inoculation of the one flask 10 ml. of the aqueous conidium suspension, containing at least $4.10^6$ conidia in 1 ml., is used. The inoculum cultivation is carried out for 48 hours at 25° C. During this time the culture comes to the start of the logarithmic phase of growth showing the maximum metabolic activity (as judged according to the rate of oxygen consumption). For inoculation of the proper fermentation media 1–5% of inoculum is used, according to the volume of the medium to be fermented.

In carrying out submerged fermentation there answers the purpose to secure rapid growth of the fungus mycelium by sufficient quantity of the inoculum and sufficient supply of oxygen. In stationary fermentations there often occurs "subdrawning" of the inoculum, by which the so called "lag phase" is sensibly prolonged (the inoculum particles sink below the medium level, thus getting in short supply of oxygen). This can be prevented by addition of a small quantity of some substances increasing the medium viscosity, e.g. agar, gelatin, methylcellulose, and the like, which additions under keeping the liquid character of the medium do not allow the inoculum, specifically heavier than the nutrient medium, to go to the bottom. Stationary cultures also need to be intensively aerated by air stream blown over the medium surface, particularly when larger volumes are to be processed. In stationary cultures the microorganismus reaches the logarithmic phase of growth already on the second or third day. The mycelium dry matter increases then approximately linearly for about 10 days. In the first incubation days the sphacelium is poor in reserve substances; only during growth fats are accumulated, the level of which is maintained up to the end of fermentation in a quantity orderly corresponding with the fat content in parasitically grown sclerotia of the same strain. With the end of the growth period also the ergotamine content reaches its maximum, which likewise orderly corresponds with that in the sclerotia of the strain used. Parallely to the formation of ergotamine there comes to pigmentation, the coloration of which likewise corresponds with the pigmentation of the sclerotia grown in parasitic culture on a host plant. On the end of cultivation ergotamine is isolated both from the mycelium and from the fermentation medium.

Submerged cultivation shows a similar course to the stationary one, taking however shorter time, so that the optimum (i.e. the maximum content of alkaloids in the volume unit of the culture) is attained earlier, in about 10 days. All that has been said about fat formation and pigmentation holds good also in this case.

Besides the abovesaid, deciding for a good course and result is in the first line the composition of the fermentation medium. Most significant is the quality and quantity of the carbon and nitrogen sources present, and their mutual ratio.

Carbon sources: From the literature is known that the fungus is able to assimilate series of monosaccharides, disaccharides and higher sugars (W. A. Taber, L. C. Vinning, Canad. J. Microbiol. 3, 1, 1957). In trials with assimilability of various glucides their exploitability was found in the degressive sequence: glucose, sucrose, trehalose, raffinose, mannitol, cellobiose, sorbitol, maltose, galactose, xylose, lactose, arabinose, rhamnose and sorbose. In view to their exploitability to the dry matter growth only the first 7 substances are practically utilizable. Out of economical reasons sucrose is preferred. However, using sucrose as the sole sugar, there is indeed satisfactory dry matter growth obtained, but biosynthesis of ergotamine does not take place. On the other hand, even slight amounts of some alcoholic sugars, e.g. sorbitol, make ergotamine formation possible. It has been experimentally found that optimum conditions for ergotamine biosynthesis are obtainable at a precise ratio of sucrose to sorbitol.

Nitrogen sources: A series of substances containing nitrogen in the form of $NO_3^-$ and $NH_4^+$ ions and in the amino and amide form have been suggested as the nitrogen source (W. A. Taber, L. C. Vinning, Can. J. Microbiol. 3, 1, 1957; 4, 611, 1958). Even if a series of nitrogen sources, whether defined or complex, can be used for cultivation, from the economical viewpoint only nitrates and ammonium salts come in consideration for practical utilization.

Even if the data of the cited paper of Taber and Vinning about the alkaloid content of cultures were based only on the non-specific color reaction with the Van Urk's reagent, they were able to demonstrate by evaluation of the dry substance accretion the very poor assimilability of nitrate nitrogen. The ammonium form of nitrogen, if supplied in the form of salts of inorganic acids, was also insufficiently assimilated compared with organic sources. The cited authors rightly believe that the poor growth in media containing ammonium salts of inorganic acids is due to one-sided assimilation of $NH_4^+$ ions and to the shift of the pH towards the non-physiological acid side, associated therewith. They also found that for the adjustment of the initial pH in the production medium only succinic acid can be used, but not the citric, tartaric, acetic, phosphoric or sulfuric acids. In good agreement herewith, in numerous papers of other authors (e.g. A. Stoll et al., Helv. Chim. Acta 37, 1815, 1954; M. Abe, Ann. Rep. of the Takeda Res. Lab. 10, 1951) the mention of ammonium succinate as the sole nitrogen source can be found. Other forms of ammonium compounds did not find use up to now.

According to our own experimental results it is possible to obtain both a very good growth of the fungus and ergotamine biosynthesis, using media containing the ion $NH_4^+$ as the sole nitrogen source, this however in the presence of various organic acids, such as the citric, oxalic, fumaric, malic, lactic or pyruvic. From the group of very various acids occurring as the current intermediate products of the pyruvic acid degradation, the cited acids occur likewise in the young sclerotia of a parasitically growing culture of the same strain. Using the ammonium form of nitrogen in the presence of one of the cited acids, it is not necessary during cultivation to readjust the pH, which kept at values favourable both to the growth and to ergotamine biosynthesis.

The ratio of carbon to nitrogen: Experimentally was established that the quantity of alkaloids produced by the culture is in direct relation with the content of lipoid substances in dry substance of mycelium. At a relatively high content of assimilable nitrogen in the nutrient medium mycelium is growing with a low fat content, and if the fat content falls below 10% of the dry substance, the culture ceases to produce significant quantity of alkaloids. On the other hand, the highest alkaloid content is found in cultures containing 30% and even more fat in the dry substance.

There are several criteria of the right course of cultivation: rapid production of the sphacelia mycelium; timely pigment formation; sufficient content of lipoid substances in the mycelium; sporulation; and finally the alkaloid content. By adaptation of the method according to the invention a rapid accretion of sphacelium takes place, the latter being in a certain phase on the point to get pigmented and to accumulate fats, in the same way as is the case in the fungus development on a host plant. During cultivation the appearance of mycelium is changing from the initial white and airy sphacelium to a delicate and pigmented mycelium, suggestive to sclerotium by its character (P. Milovidov, Česká mykologie 10, 221, 1956).

In general there can be summarized that the method according to the invention makes possible to lead saprophytic cultivations in a way corresponding to the growth course in natural parasitic culture, the consequence of which is that the cultivation method hereinbefore disclosed is not specific for a particular ergot strain (*Claviceps purpurea* Tul.) alone, but complies with the most various strains differing in effectiveness and alkaloid type. In such a case the alkaloid spectrum produced in saprophytic culture corresponds to the type of sclerotium, from which the strain used has been isolated.

The described method of artificial cultivation of ergot in saprophytic culture brings about technical improvement and economical advantage in utilization of easily available and inexpensive raw materials, in particular the nitrogen source, and in that it does not require during all the cultivation period any interventions, which on a larger scale could become technically exacting and expensive. The cultivation proceeds in a single stage and under natural conditions, thus allowing self-regulation of the process.

By way of illustration and not limitation the following examples are herewith given.

*Example 1.*—The cultivation was performed in Fernbach flasks of 1000 ml. capacity, filled each with 600 ml. cultivation medium composed of: sucrose 7.5%, sorbitol 2.5%, citric acid 0.5%, $NH_3$ 0.54%, $Ca(NO_3)_2.4H_2O$ 0.15%, $MgSO_4$ 0.025%, $KH_2PO_4$ 0.025%, agar 0.05% and tap water. The pH was adjusted to 6.0 before sterilization, which was performed at 1 atm. g. for 35 minutes. For inoculation 20 ml. inoculum 48 hours old, grown in 3° Bé. malt infusion on a rotary shaker at 25° C. was taken. The flasks were agitated after inoculation. Incubation time at 25° C. was 22 days. At the end of cultivation the mycelium was separated from the cultivation medium, washed with water and dried in air stream at room temperature. In an aliquot part of the dry mycelium the ergotamine content was determined semiquantitatively by means of paper chromatography (J. Trojánek, Z. Veselý, Z. Čekan, Planta Medica, under press). There was found 0.14% ergotamine in the mycelium dry matter. The presence of any other peptide alkaloid, except traces of ergotamine, probably formed in processing the sample, could not be detected by paper chromatography. The fermentation liquor after having been freeze-dried was analytically examined in the same way. From all the other dry material the alkaloids were isolated and identified in this way: After alkalization the bases were extracted into an organic solvent (benzene), therefrom taken out into an organic acid solution (tartaric acid), and by alkalization of the acid extract crude ergotamine was obtained, which on purification showed qualities conform to an authentic sample.

*Example 2.*—The cultivation was performed in a laboratory fermentation tank of 3 l. capacity filled with 1400 ml. fermentation medium of the composition: sucrose 4%, sorbitol 1.5%, citric acid 0.3%, $NH_3$ 0.32%, $Ca(NO_3)_2.4H_2O$ 0.15%, $MgSO_4$ 0.025%, $KH_2PO_4$ 0.025%, yeast autolysate 0.1% and tap water. The pH was adjusted to 6.3 before sterilization, which was performed at 1 atm. g. for 60 minutes. For inoculation 5% of inoculum prepared in the same way as in Example 1 was used. The fermentation was carried out at a temperature 25° C. under aeration with 0.7 liter/min. air at 700 revolutions/min. of the stirrer. Fermentation period 7 days, production of mycelium dry substance 1.5%. Both the mycelium and the fermentation medium were worked up as in Example 1. In the dry substance of mycelium 0.07% ergotamine was found.

*Example 3.*—The cultivation was performed with a strain *Claviceps purpurea* Tul. isolated from the sclerotia parasiting on rye, containing 0.420% alkaloids of the ergotoxine group in the dry substance. The single alkaloids of the ergotoxine group were apportioned in the ratio: ergocristine:ergocornine:ergocryptine 3:1:2. The stationary cultivation was performed in Fernbach flasks of 25 l. capacity filled each with 14 l. cultivation medium of the same composition as in Example 1, with the only differences, that starting from the 3rd incubation day air was introduced in mild stream over the medium surface. Cultivation period was 19 days. The mycelium and the fermentation medium were processed in the same way as in Example 1. There was found 0.18% total alkaloids in the mycelium dry substance. As established with aid of paper chromatography, the ratio of the single alkaloids of the ergotoxine group was corresponding to the ratio given by the strain used.

What we claim is:

1. In a method of preparing ergot alkaloids, the step of artifically cultivating ergot (*Claviceps purpurea* Tul.) under access of air in a liquid nutritive medium containing assimilable nitrogen, nutritive mineral salts, trace elements and growth factors, and including as a source of carbon a mixture of at least one aldohexose selected from the group consisting of sucrose and glucose, and of at least one hexitol selected from the group consisting of mannitol and sorbitol in a ratio of from 1:1 to 10:1, the total amount of said mixture being equal to between 2–30% weight/volume of said medium, and further including at least 1 carboxylic acid selected from the group consisting of citric, oxalic, fumaric, maleic, lactic and pyruvic acids in an amount equal to between 0.05–5% weight/volume of said medium.

2. In a method of preparing ergot alkaloids, the step of artificially cultivating ergot (*Claviceps purpurea* Tul.) under access of air in a liquid nutritive medium containing assimilable nitrogen in the form of ammonium ions, nutritive mineral salts, trace elements and growth factors, and including as a source of carbon a mixture of at least one aldohexose selected from the group consisting of sucrose and glucose, and of at least one hexitol selected from the group consisting of mannitol and sorbitol in a ratio of about 3:1, the total amount of said mixture being equal to between 5–10% weight/volume of said medium, and further including at least 1 carboxylic acid selected from the group consisting of citric, oxalic, fumaric, maleic, lactic and pyruvic acids in an amount equal to between 0.1–1% weight/volume of said medium.

3. In a method of preparing ergot alkaloids, the step of of artificially cultivating ergot (*Claviceps purpurea* Tul.) under access of air in a liquid nutritive medium containing assimilable nitrogen in the form of ammonium ions, nutritive mineral salts, trace elements and growth factors, and including as a source of carbon a mixture of at least one aldohexose selected from the group consisting of sucrose and glucose, and of at least one hexitol selected from the group consisting of mannitol and sorbitol in a ratio of about 3:1, the total amount of said mixture being equal to between 5–10% weight/volume of said medium, and further including citric acid in an amount equal to between 0.1–1% weight/volume of said medium.

4. In a method of preparing ergot alkaloids, the step of artificially surface cultivating ergo (*Claviceps purpurea* Tul.) under access of air in a liquid nutritive medium containing assimilable nitrogen in the form of ammonium ions, nutritive mineral salts, trace elements and growth factors, and including as a source of carbon a mixture of at least one aldohexose selected from the group consisting of sucrose and glucose, and of at least one hexitol selected from the group consisting of mannitol and sorbitol in a ratio of about 3:1, the total amount of said mixture being equal to between 5–10% weight/volume of said medium, and further including at least 1 carboxylic acid selected from the group consisting of citric, oxalic, fumaric, maleic, lactic and pyruvic acids in an amount equal to between 0.1–1% weight/volume of said medium plus between 0.01–2% weight/volume of a macromolecular viscosity increasing water-soluble agent selected from the group consisting of agar, gelatin and methylcellulose.

References Cited in the file of this patent

UNITED STATES PATENTS

| | | |
|---|---|---|
| 2,809,920 | Stoll et al. | Oct. 15, 1957 |
| 2,835,675 | Abe et al. | May 20, 1958 |
| 2,936,266 | Windisch et al. | May 10, 1960 |